United States Patent [19]

Yasue et al.

[11] 4,249,682
[45] Feb. 10, 1981

[54] SPARE WHEEL PROTECTING SYSTEM

[75] Inventors: Setsuo Yasue, Gifu; Tomio Yamamoto, Aichi, both of Japan

[73] Assignee: Sankokiki Kabushiki Kaisha, Aichi, Japan

[21] Appl. No.: 894,378

[22] Filed: Apr. 7, 1978

[30] Foreign Application Priority Data

Sep. 24, 1977 [JP] Japan .................................. 52/114936

[51] Int. Cl.³ .............................................. B62D 43/00
[52] U.S. Cl. .................................. 224/42.23; 81/121A; 254/266; 254/372
[58] Field of Search ................ 224/42.21, 42.23, 42.12, 224/42.24, 42.25; 214/451, 454; 254/186 HC, 169; 81/121 A, 121 R, 119, 177 G, 90 C, 90 B; 403/19, 263; 70/346; 483/3, 4, 354

[56] References Cited

U.S. PATENT DOCUMENTS

| | | | |
|---|---|---|---|
| 1,018,172 | 2/1912 | Downs | 81/121 A |
| 3,086,414 | 4/1963 | Nardi | 81/121 A |
| 3,526,160 | 9/1970 | Thurber | 81/121 R |
| 3,856,167 | 12/1974 | Yasue et al. | 224/42.23 |
| 3,868,874 | 3/1975 | Olashaw | 81/121 R |
| 3,874,536 | 4/1975 | Watanabe | 224/42.23 |

FOREIGN PATENT DOCUMENTS 142687  10/1902  Fed. Rep. of Germany ........... 403/354

Primary Examiner—Robert J. Spar
Assistant Examiner—Kenneth Noland
Attorney, Agent, or Firm—Dennison, Meserole, Pollack & Scheiner

[57] ABSTRACT

A spare wheel protecting system, associated with a plurality of spare wheel holding devices each holding a spare wheel under the chassis of a motor vehicle, for preventing any such spare wheel from being stolen, comprises a socket and an interlocking axle which are provided in each such spare wheel holding device and engageable with each other to connect the operating handle and the driving shaft for the winch mechanism of each spare wheel holding device to permit rotation of the operating handle for rotating the driving shaft. Each socket has at least two engaging elements and each interlocking axle has a corresponding number of engaging elements each of which is complementary to a corresponding one of the engaging elements on a corresponding socket. The engaging elements on both the socket and the interlocking axle are so positioned as to establish their relative position which differs from one spare wheel holding device to another to permit connection of the interlocking axle on a particular spare wheel holding device only with the socket on that particular spare wheel holding device.

2 Claims, 18 Drawing Figures

SPARE WHEEL PROTECTING SYSTEM

This invention relates to a spare wheel protecting system, associated with a plurality of spare wheel holding devices each holding a spare wheel under the chassis of a motor vehicle, for preventing any such spare wheel from being stolen.

A spare wheel holding device usually comprises a winch mechanism mounted on the underside of the chassis of a motor vehicle, a wheel supporting member connected to the lower end of a vertically movable chain suspended from the winch mechanism and an operating handle which can be connected to a socket provided at the end of a chain driving shaft in the winch mechanism. The operating handle may be connected to the chain driving shaft with its end inserted in the socket, and rotated in either direction to raise or lower the wheel supporting member on which a spare wheel is carried for movement toward or away from the underside of the chassis, thereby lifting the spare wheel from the ground to hold it in position immediately under the chassis or lowering it from its position under the chassis onto the ground.

A known spare wheel holding device mounted on a particular motor vehicle is, however, equipped with an operating handle which is interchangeable with that of another spare wheel holding device on another motor vehicle. In other words, the handle of one spare wheel holding device can easily be connected to the chain driving shaft of another spare wheel holding device to effectively rotate it in either direction. Accordingly, the spare wheel held under the chassis of a motor vehicle by such a spare wheel holding device can easily be lowered onto the ground by using the handle of any other spare wheel holding device on a different motor vehicle. Thus, there is every likelihood that the spare wheel held under the chassis of a motor vehicle by any such known spare wheel holding device may very easily be detached from the device and stolen by using the handle of another spare wheel holding device of the same construction.

It is, therefore, an object of this invention to provide a spare wheel protecting system associated with a plurality of spare wheel holding devices which prevents a spare wheel held by any such spare wheel holding device under the chassis of a motor vehicle from being easily removed and stolen by using the handle of any other such spare wheel holding device. This object is attained by this invention which contemplates elimination of the aforementioned interchangeability of operating handles in known spare wheel holding devices in view of the fact that such interchangeability of the handles is apparently the principal reason why the spare wheel held by a known spare wheel holding device is likely to be easily removed and stolen by using the handle of another spare wheel holding device. Thus, this invention provides a spare wheel protecting system structurally associated with a plurality of spare wheel holding devices which essentially comprises a plurality of different interlocking axle and socket combinations each including cooperative engaging means differing in relative position from their counterparts on any other such combination. One of such interlocking axle and socket combinations is provided in each of such spare wheel holding devices, so that the relative position between the cooperative engaging means on the interlocking axle and the socket is different from one spare wheel holding device to another. In each such interlocking axle and socket combination provided by one spare wheel holding device, one of the socket and the interlocking axle may be formed at one end of the driving shaft in the winch mechanism, while the other is provided at one end of the operating handle. One of either the socket or the interlocking axle is formed with an engaging protuberance and the other with an engaging recess which is complementary to and engageable with that engaging protuberance. The engaging protuberance and recess define a pair of mutually engageable means and each interlocking axle and socket combination includes at least two pairs of such mutually engaging means. The relative position between those engaging means on both the interlocking axle and the socket is different from one such interlocking axle and socket combination to another to thereby permit a particular interlocking axle to engage only with the particular socket which is complementary to that particular interlocking axle.

In the system of this invention, a "key and keyhole" relationship is established by the interlocking axle and the socket either formed respectively on the end of the operating handle or the end of the driving shaft in the winch mechanism in each of the spare wheel holding devices involved, or located in a reverse way of arrangement. As a key cannot be inserted into a different keyhole, an interlocking axle cannot be engagingly inserted into a socket to connect an operating handle to a driving shaft if the relative position of at least two interlocking protuberances or recesses formed on the interlocking axle does not match that of at least two interlocking recesses or protuberances on the socket. Accordingly, it is impossible to connect the operating handle of one spare wheel holding device with the driving shaft in the winch mechanism of another spare wheel holding device because of the absence of the correct "key and keyhole" relationship, or in other words, the lack of interchangeability of the handles between one spare wheel holding device and another. If the system of this invention is employed, therefore, there is no possibility that the spare wheel held by one spare wheel holding device under the chassis of a motor vehicle may be easily detached and stolen by using the operating handle of another spare wheel holding device.

The invention will now be described in further detail by way of example with reference to the accompanying drawings, in which:

FIG. 7b is a partly omitted side elevational view, partly in section, of an operating handle for the winch mechanism shown in FIG. 7a;

FIG. 8b is a front elevational view of the socket shown in FIG. 8a;

FIG. 9b is a side elevational view of the interlocking axle shown in FIG. 9a;

Figure 1:
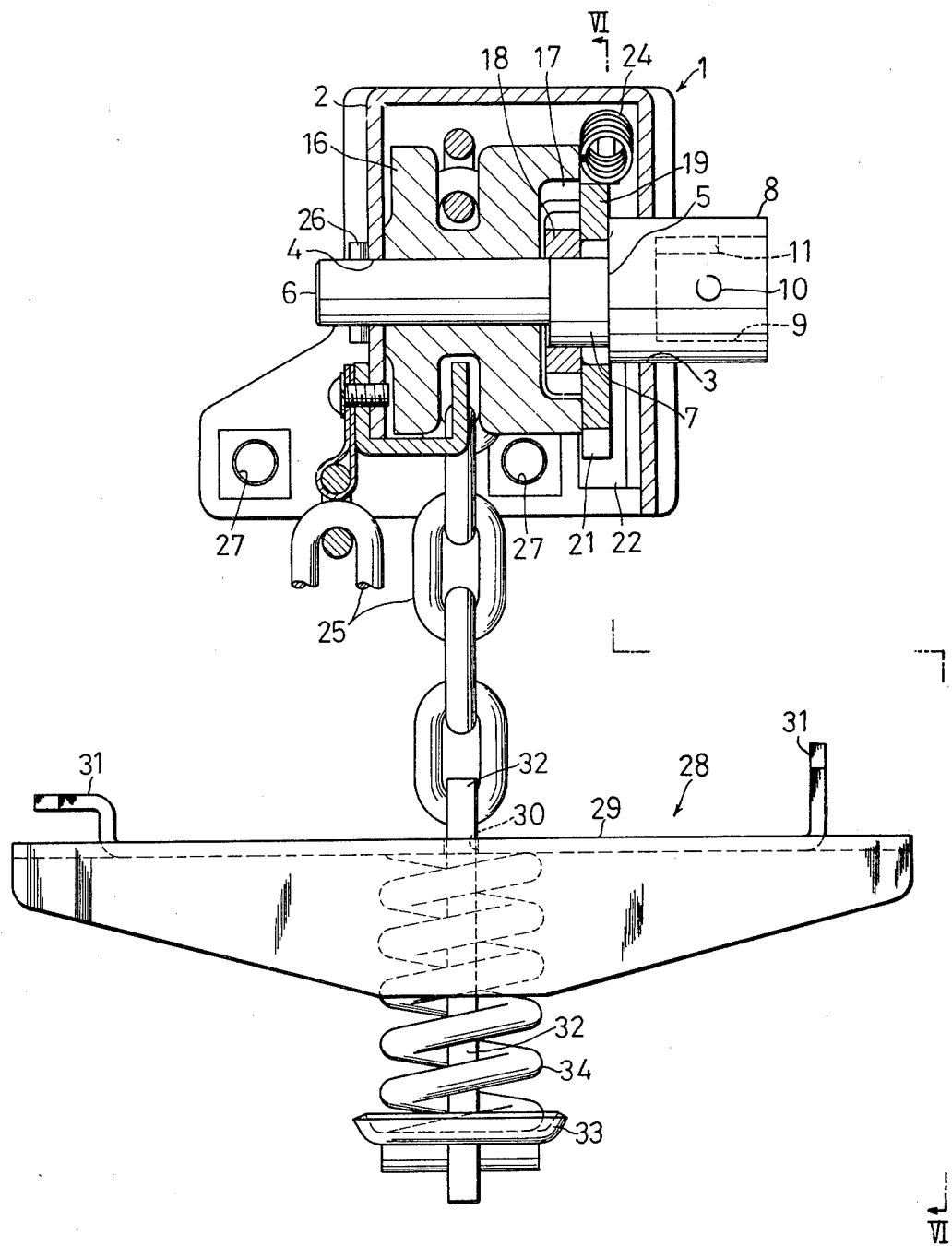
FIG. 1 is a side elevational view, partly in section, of a spare wheel holding device to which a spare wheel protecting system embodying this invention is applied.
Figure 2:
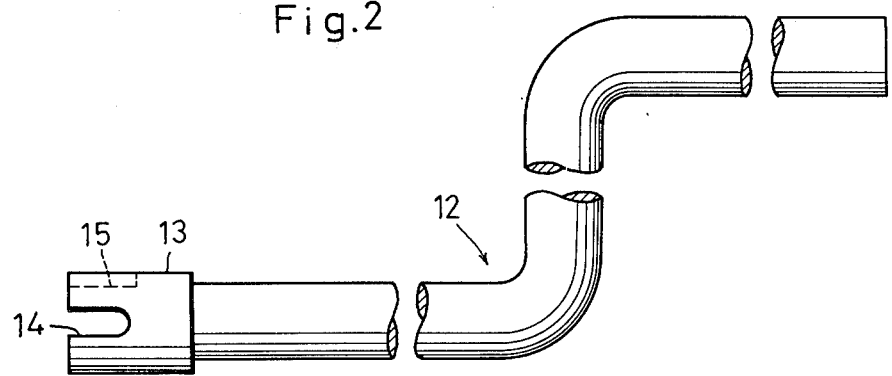
FIG. 2 is a partly omitted side elevational view of an operating handle for use with the apparatus shown in FIG. 1.

Referring to FIGS. 1 through 6 of the drawings, there is shown a spare wheel protecting system embodying this invention, including a socket 8 provided at the front end of a driving shaft 5 in a winch mechanism 1 adapted to be secured to the underside of the chassis of a motor vehicle. The socket 8 is coaxial with the driving shaft 5 as shown in FIG. 1. The socket 8 has the shape of a cup including an interlocking recess 9 having a circular cross-section which opens at the front or free end of the socket 8, as shown in FIGS. 1 and 3a. The socket 8 is provided with a diametrically extending pin 10 having a pair of opposite ends anchored in the side wall of the socket 8. The inner peripheral surface of the socket 8 is provided with an elongate protuberance 11 extending from the bottom wall of the interlocking recess 9 along the longitudinal axis of the interlocking recess 9. The elongate protuberance 11 terminates in the longitudinally middle portion of the interlocking recess 9 and has a front end recessed from the front end of the socket 8 at a distance equal to the distance between the pin 10 and the front end of the socket 8, as illustrated in FIG. 1. The system of this invention further includes an interlocking axle 13 provided at one end of an operating handle 12 having the shape of a crank formed from a round rod having a pair of oppositely directed, perpendicular bends in its mid-portion. The interlocking axle 13 is coaxial with one end of the operating handle 12 and has a circular cross-section and a relatively short length. The interlocking axle 13 is engageable into the interlocking recess 9 of the socket 8. As shown in FIGS. 2 and 3b, the interlocking axle 13 is formed with a diametrically extending transverse recess 14 at its front or free end. It is further provided on the peripheral surface with a longitudinal groove 15 extending from the front end of the interlocking axle 13 along the longitudinal axis thereof.

Figure 4:
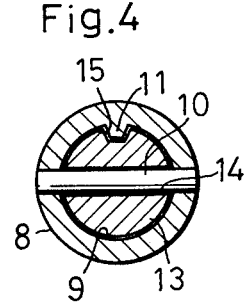
FIG. 4 is a cross-sectional view showing the socket of FIG. 3a and the interlocking axle of FIG. 3b in mutually interlocked relationship.
Figure 3A:
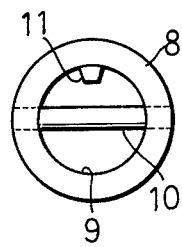
FIG. 3a is a front elevational view of a socket formed on a driving shaft in the winch mechanism of the device shown in FIG. 1.
Figure 3B:
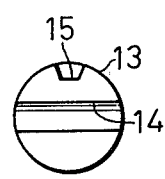
FIG. 3b is a front elevational view of an interlocking axle formed on the operating handle shown in FIG. 2.
Figure 5A:
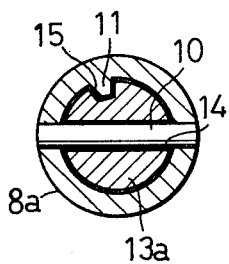
FIGS. 5a through 5d are views similar to FIG. 4, showing modified sockets and interlocking axles in interlocked relationship.
Figure 5B:
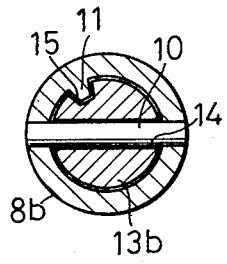
Figure 5C:
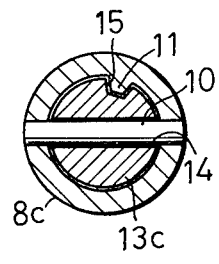
Figure 5D:
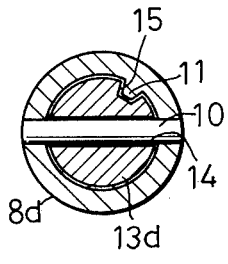

In order to connect the operating handle 12 to the driving shaft 5, the interlocking axle 13 on the operating handle is inserted into the interlocking recess 9 of the socket 8 by engaging the pin 10 defining a first engaging protuberance on the socket 8 into the transverse recess 14 defining a first engaging recess on the interlocking axle 13 and fitting the elongate protuberance 11 defining a second enagaging protuberance on the socket 8 into the longitudinal groove 15 defining a second engaging recess on the interlocking axle 13 to thereby connect the interlocking axle 13 with the socket 8 as shown in FIG. 4. According to this invention, however, the spare wheel protecting system comprises, in addition to the combination shown in FIG. 4, a plurality of other socket and interlocking axle combinations consisting of a plurality of different sockets having a different relative position between the first engaging protuberance 10 and the second engaging protuberance 11 from one another and a corresponding number of different interlocking axles having a different relative position between the first engaging recess 14 and the second engaging recess 15 from one another.

FIGS. 5a through 5d illustrate, merely by way of example, such other different socket and interlocking axle combinations 8a and 13a, 8b and 13b, 8c and 13c, and 8d and 13d, respectively. Each such combination forms a different "key and keyhole" relationship from one another, so that the interlocking engagement between a socket and an interlocking axle is possible only when the relative position between the first and second engaging protuberances 10 and 11 on the socket matches that between the first and second engaging recesses 14 and 15 on the interlocking axle, thereby permitting effective connection of the operating handle 12 to the driving shaft 5. If no such matching relationship exists between the socket and the interlocking axle, the first and second engaging protuberances 10 and 11 on the socket hinder insertion of the interlocking axle into the interlocking recess 9 of the socket to prevent interlocked insertion of the interlocking axle into the socket to thereby prevent the operating handle 12 to be effectively connected to the driving shaft 5.

Figure 6:
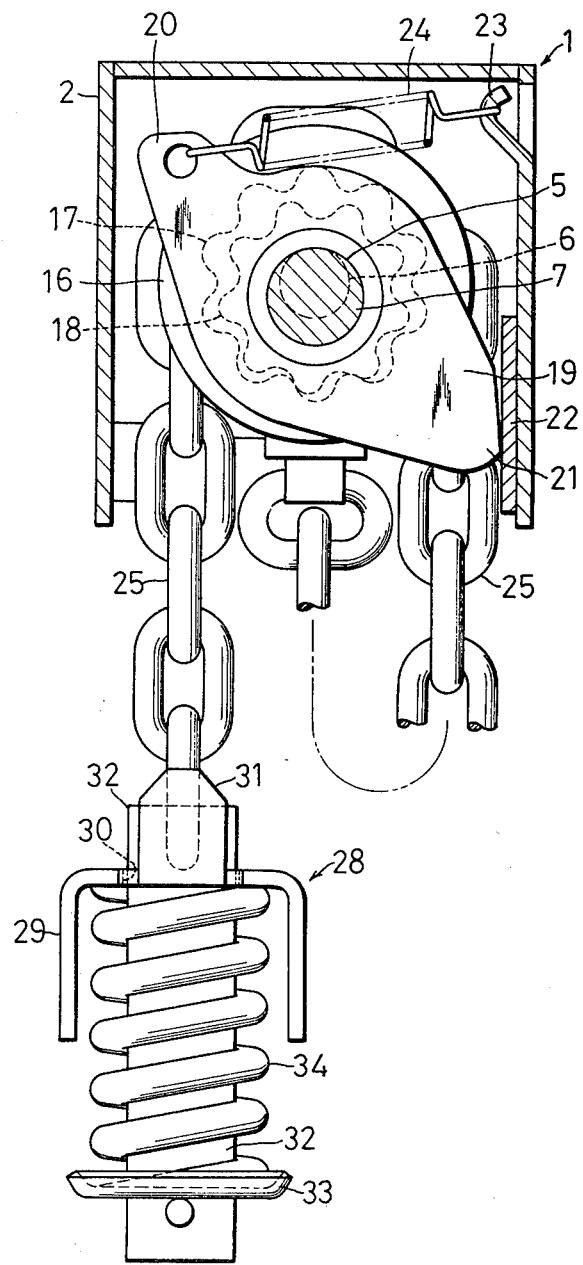
FIG. 6 is a sectional view taken along the line VI—VI of FIG. 1.

As shown in FIGS. 1 and 6, the winch mechanism 1 includes a rectangular casing 2 having an open bottom. The casing 2 has a front wall through which a shaft receiving hole 3 is provided, and a rear wall through which a shaft receiving hole 4 is provided coaxially with the shaft receiving hole 3 in the front wall. The driving shaft 5 is formed by a chain wheel supporting shaft 6 having a rear end rotatably supported in the shaft receiving hole 4 of the rear wall of the casing 2, an eccentric cam 7 and the socket 8 which is rotatably supported in the shaft receiving hole 3 of the front wall of the casing 2. The socket 8 is coaxial with, but has a larger diameter than, the chain wheel supporting shaft 6. The eccentric cam 7 is interposed between and integrally connected to the chain wheel supporting shaft 6 and the socket 8.

A chain wheel 16 is slidably supported on the chain wheel supporting shaft 6 to permit the sliding movement of the chain wheel supporting shaft 6 relative to the chain wheel 16 upon rotation of the driving shaft 5. The chain wheel 16 has a front end surface formed with an internally toothed gear 17. An externally toothed gear 18 meshing with the internally toothed gear 17 is slidably supported on the eccentric cam 7. The externally toothed gear 18 has a smaller number of teeth than the internally toothed gear 17. The externally toothed gear 18 has a front surface to which a generally oval restricting plate 19 is secured for preventing the rotation of the externally toothed gear 18 about its own axis. The restricting plate 19 has an upper end and a lower end defining an upper projection 20 and a lower projection 21, respectively. A reinforcing plate 22 is secured to the inner surface of the right-hand sidewall of the casing 2 and the lower projection 21 of the plate 19 can abut on the reinforcing plate 22 as shown in FIG. 6. The upper projection 20 of the plate 19 is provided with an aperture. A helical spring 24 has one end anchored in the aperture of the upper projection 20 of the plate 19, while the other end of the spring 24 is fastened to a hook 23 projecting from the inner surface of the right-hand sidewall of the casing 2. A chain 25 extends around the chain guide groove of the chain wheel 16 and has an upper end secured to the lower end of the rear wall of the casing 2, while the lower end of the chain 25 extends downwardly and outwardly through the open bottom of the casing 2. A stop pin 26 extends diametrically through the rear end of the driving shaft 5 projecting outwardly from the rear wall of the casing 2. The opposite sidewalls of the casing 2 are provided with a plurality of holes 27 adjacent to the lower edges thereof to assist the mounting of the winch mechanism 1 on the chassis of a motor vehicle. A wheel supporting device 28 is suspended from the winch mechanism 1 by the chain 25. As shown in FIGS. 1 and 6, the wheel supporting device 28 includes a vertical central member 32 connected to the lower end of the chain 25 and a horizontal wheel supporting member 29 having an inverted U-shaped cross section and provided in its mid-portion with a hole 30 through which the vertical central member 32 extends. A spring holding member 33 is secured to the lower end of the vertical central member 32 which is located below the wheel supporting member 29. A helical spring 34 encircles the vertical central member 32 and has an upper end on which the wheel supporting member 32 rests, while the lower end of the spring 34 rests on the spring holding member 33. The wheel supporting member 29 has a pair of upward projections 31 adjacent to its opposite ends which are adapted to engage the inner periphery of the disc of a spare wheel to support it on the upper surface of the wheel supporting member 29.

In the use of the system embodying this invention on a plurality of large motor vehicles, such as trucks, the winch mechanism 1 of a first spare wheel holding device is secured to the underside of the chassis of a first vehicle by using the holes 27 of the winch casing 2 and any other known cooperative fastening means. That vehicle should have an appropriate tool box or the like provided with a key without which the tool box cannot be opened, in order to secure the operating handle 12 with the interlocking axle 13 which is effectively engageable with the socket 8 of the winch mechanism 1 of the first spare wheel holding device. Likewise, the other vehicles are equipped with the winch mechanisms having the sockets 8a through 8d which are all different from the socket 8 and from one another in construction as hereinbefore detailed, and the operating handles having the interlocking axles 13a through 13d which are effectively engageable with the sockets 8a through 8d, respectively. It is herein to be noted that while in the embodiment being described, the spare wheel protecting system of this invention involves five spare wheel holding devices mounted on five motor vehicles, the invention may equally be applicable to any other reasonable number of motor vehicles.

In order to hoist a spare wheel and hold it under the chassis of a motor vehicle, the wheel supporting device 28 suspended from the winch mechanism 1 to the ground is inserted through the central hole of the disc of the spare wheel to allow the inner periphery of the wheel disc to rest on the top of the wheel supporting member 29 and be engaged by the projections 31 at the ends of the wheel supporting member 29, so that the spare wheel is supported on the wheel supporting device 28. The operating handle 12 is taken out from the tool box on the first vehicle and its interlocking axle 13 is engagingly inserted into the socket 8 on the driving shaft of the winch mechanism to connect the handle 12 to the driving shaft 5. Upon rotation of the handle 12 clockwise as viewed from the front side of the winch casing 2, the driving shaft 5 is rotated to rotate the chain wheel 16 clockwise at a reduced speed to haul up the chain 25. When the chain is being hauled up, the load imposed by the spare wheel, etc. imparts a force of counterclockwise rotation to the chain wheel 16, which is in turn imparted to the plate 19 secured to the externally toothed gear 18 meshing with the internally toothed gear 17 which is integral with the chain wheel 16, so that the restricting plate 19 rotates counterclockwise as viewed in FIG. 6 by overcoming the force of the spring 14 urging the restricting plate 19 clockwise. Upon such counterclockwise rotation of the restricting plate 19, the lower projection 21 on the restricting plate 19 abuts on the reinforcing plate 22 on the inner surface of the right-hand sidewall of the casing 2 as shown in FIG. 6. This abutment prevents rotation of the externally toothed gear 18 about its own axis. With clockwise rotation of the eccentric cam 7, however, the externally toothed gear 18, while maintaining engagement with the internally toothed gear 17, revolves about the axis of the chain wheel supporting shaft 6 in a circle having a radius equal to the distance of eccentricity of the eccentric cam 7. During each rotation of the operating handle 12 causing one rotation of the eccentric cam 7, the externally toothed gear 18 makes one revolution, restoring its original position, without rotating about its own axis, while the internally toothed gear 17 rotates clockwise through an angular distance defined by the difference in the number of teeth between the internally toothed gear 17 and the externally toothed gear 18. In the embodiment shown in the drawing, the internally toothed gear 17 has one more tooth than the externally toothed gear 18 and the angular distance through which the internally toothed gear 17 rotates during each rotation of the operating handle 12 is equal to the center distance between two adjoining teeth of the internally toothed gear 17. Accordingly, during each rotation of the operating handle 12, the internally toothed gear 17 makes 1/10 of one rotation to permit the chain wheel 16 to effect 1/10 of one rotation to thereby gradually haul up the chain 25. As the chain 25 is hauled up, the wheel supporting device 28 carrying a spare wheel thereon is raised to bring the upper surface of the spare wheel into contact with the underside of the chassis of the motor vehicle. The helical spring 34 in the wheel supporting device 28 is compressed to its full extent and the chain 25 cannot be hauled up any more. Then, the operating handle 12 is detached from the socket 8 and returned into the tool box on the motor vehicle. The spare wheel thus lifted into a position of resilient contact with the underside of the chassis of the motor vehicle is maintained in that position under the self-locking action of the winch mechanism 1 which is due to loads, such as the weight of the spare wheel bearing on the chain wheel 16 via the chain 25 and the repulsive force of the helical spring 34.

In order to lower the spare wheel to remove it from the spare wheel holding device, the operating handle 12 is again taken out from the tool box on the motor vehicle and connected to the socket 8 on the driving shaft in the winch mechanism. The operating handle 12 is then rotated counterclockwise, i.e., in a direction opposite to that in which it is rotated to raise the spare wheel. This rotation of the handle causes rotation of the driving shaft 5 to rotate the chain wheel 16 counterclockwise at a reduced speed to thereby unwind the chain 25 from the chain wheel 16. As the chain 25 is unwound, the wheel supporting device 28 and the spare wheel carried thereon are lowered onto the ground and when the chain 25 has slackened, the operating handle 12 is detached from the socket 8 and the spare wheel is released from the wheel supporting device 28.

The use of any other handle provided with the interlocking axle 13a, 13b, 13c or 13d which is different in construction from the interlocking axle 13 on the aforementioned handle 12 will result in failure to lower the spare wheel to remove it from the spare wheel holding device, because the first and second engaging protuberances 10 and 11 in the socket 8 which is only complementary to the interlocking axle 13 on the operating handle 12 prevents effective insertion of the interlocking axle 13a, 13b, 13c or 13d on any other handle into the interlocking recess 9 of the socket 8. Thus, the spare wheel protecting system of this invention protects the spare wheel held under the chassis of a motor vehicle from being easily detached and stolen by using any such other operating handle.

Figure 7A:
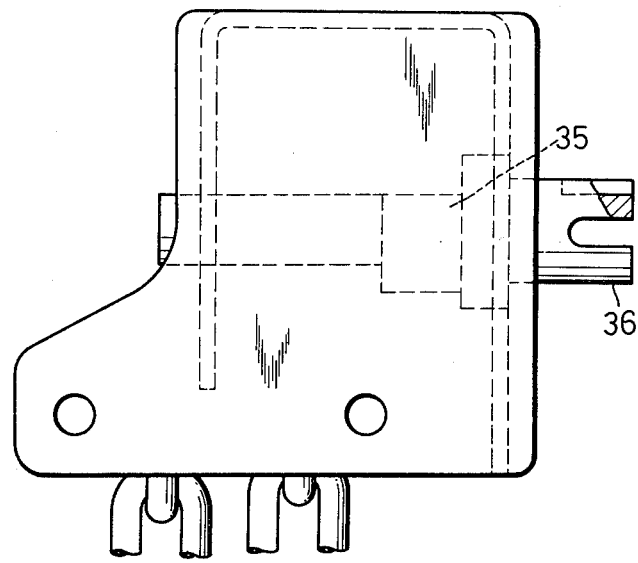
FIG. 7a is a side elevational view, partly in section, of a modified winch mechanism.
Figure 7B:
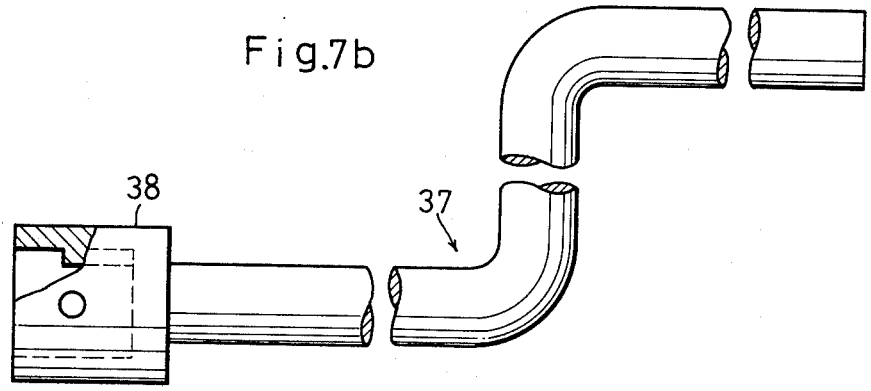

While a preferred embodiment of this invention has been described in detail with reference to FIGS. 1 through 6 of the drawings, the invention should not be interpreted as being restricted to the specific construction described. Insofar as this invention essentially aims at providing protection of spare wheels on motor vehicles by eliminating the interchangeability of operating handles for spare wheel holding devices, it is to be understood that the scope of this invention may be extended to include any other modifications or variations, including the following:

(1) While in the embodiment of FIGS. 1 through 6, the socket 8 is provided on the driving shaft 5 in the winch mechanism with the interlocking axle 13 on the operating handle 12, it is equally possible to provide an interlocking axle 36 on a driving shaft 35 in a winch mechanism and a complementary socket 38 on an operating handle 37 as shown in FIGS. 7a and 7b.

Figure 8A:
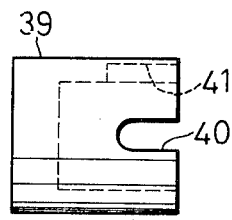
FIG. 8a is a side elevational view of still another modified socket.
Figure 8B:
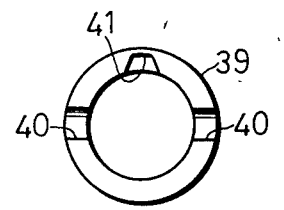
Figure 9A:
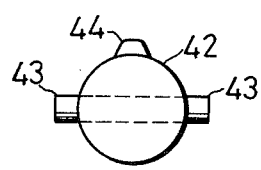
FIG. 9a is a front elevational view of an interlocking axle which is cooperative with the socket shown in FIGS. 8a and 8b.
Figure 9B:
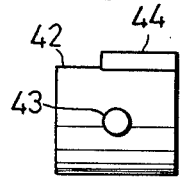
Figure 10:
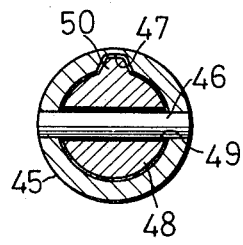
FIG. 10 is a cross-sectional view showing still another mutually interlocked socket and interlocking axle combination.

(2) While in the embodiment of FIGS. 1 through 6, the first and second engaging protuberances 10 and 11 are provided on the socket 8 and the first and second engaging recesses 14 and 15 on the interlocking axle 13, it is equally possible to form a socket 39 with first and second engaging recesses 40 and 41 as shown in FIGS. 8a and 8b and provide an interlocking axle 42 with first and second engaging protuberances 43 and 44 as shown in FIGS. 9a and 9b. Alternatively, it is possible to form a first engaging protuberance 46 and a second engaging recess 47 on a socket 45, while an interlocking axle 48 is provided with a first engaging recess 49 and a second engaging protuberance 50 as shown in FIG. 10.

Figure 11:
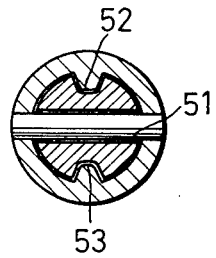
FIG. 11 is a view similar to FIG. 10, showing a further interlocked socket and interlocking axle combination.

(3) While the embodiment of FIGS. 1 through 6 includes two engaging means each on the socket 8 and the interlocking axle 13, it is equally possible to provide three such engaging means on each of the socket and the interlocking axle, so that the socket and interlocking axle may be engaged with each other at three points as shown at 51, 52 and 53 in FIG. 11. It is further possible that the system may include four points of such interlocking engagements, though not specifically shown in the drawing. It will easily be understood that as a greater number of points of such engagements are provided on the system of this invention, the invention is more usefully applicable to a greater number of spare wheel holding apparatuses by providing a greater number of incooperative operating-handle-and-driving-shaft combinations.

(4) Other variations may be made by selectively combining the modifications set forth in (1), (2) and (3) above without departing from the essence or spirit of this invention.

What is claimed is:

1. A spare wheel protective system associated with a plurality of spare wheel holding devices, each holding a spare wheel under a motor vehicle chassis, to preclude operation and wheel removal by anyone other than the vehicle owner, each spare tire wheel holding device including a winch fixed on a driving shaft which may rotate in either direction for selective raising or lowering said spare wheel, and an operating handle having a drive end connectable to one end of said driving shaft to transmit turning power thereto; said protective system comprising:

a recessed socket means and an interlocking axle means, one of said socket means or axle means being fixed on the end of the driving shaft, the other of said means comprising the drive end of said handle, said axle means being engageable with said socket means to transmit turning power thereto, said socket means having at least two engaging means therein, said axle means having a corresponding number of engaging means thereon, each of which is complementary and adapted to mate with the corresponding engaging means in said socket means, the relative spatial relationship between each of the engaging means in the socket means, and the corresponding engaging means on the axle means, differing for each spare wheel holding device to preclude interconnection of any operating handle thereto, other than one having the predetermined spatial relationship of the engaging means thereon, and wherein both of said socket means and said interlocking axle means have two said engaging means, both of which on said socket means are protuberances, while both of said two engaging means on said interlocking axle means are recesses, wherein a first of said protuberances is a pin secured to said socket means and extending transversely therethrough, while a first of said recesses is formed in an end surface of said interlocking axle means transversely across said end surface to receive said pin, and wherein a second of said protuberances is an elongate protuberance formed on an inner wall of said socket means and extending along the longitudinal axis thereof, while a second of said recesses is a groove formed on the peripheral surface of said interlocking axle means and extending along the longitudinal axis thereof to receive said elongate protuberance.

2. A spare wheel protective system associated with a plurality of spare wheel holding devices, each holding a spare wheel under a motor vehicle chassis, to preclude operation and wheel removal by anyone other than the vehicle owner, each spare tire wheel holding device including a winch fixed on a driving shaft which may rotate in either direction for selective raising or lowering said spare wheel, and an operating handle having a drive end connectable to one end of said driving shaft to transmit turning power thereto; said protective system comprising:

a recessed socket means and an interlocking axle means, one of said socket means or axle means being fixed on the end of the driving shaft, the other of said means comprising the drive end of said handle, said axle means being engageable with said socket means to transmit turning power thereto, said socket means having at least two engaging means therein, said axle means having a corresponding number of engaging means thereon, each of which is complementary and adapted to mate with the corresponding engaging means in said socket means, the relative spatial relationship between each of the engaging means in the socket means, and the corresponding engaging means on the axle means, differing for each spare wheel holding device to preclude interconnection of any operating handle thereto, other than one having the predetermined spatial relationship of the engaging means thereon, and wherein said socket means is provided on said one end of said driving shaft, while said interlocking axle means is formed on said drive end of said operating handle, wherein both of said socket means and said interlocking axle means have two said engaging means, both of which on said socket means are protuberances, while both of said two engaging means on said interlocking axle means are recesses, wherein a first of said protuberances is a pin secured to said socket means and extending transversely therethrough, while a first of said recesses is formed in an end surface of said interlocking axle means transversely across said end surface to receive said pin, and wherein a second of said protuberances is an elongate protuberance formed on an inner wall of said socket means and extending along the longitudinal axis thereof, while a second of said recesses is a groove formed on the peripheral surface of said interlocking axle means and extending along the longitudinal axis thereof to receive said elongate protuberance.

* * * * *